March 20, 1956  A. W. POPE  2,739,247
CONTROL FOR THE ENGINE AND STARTING
CIRCUITS OF A MOTOR VEHICLE
Filed Nov. 18, 1954
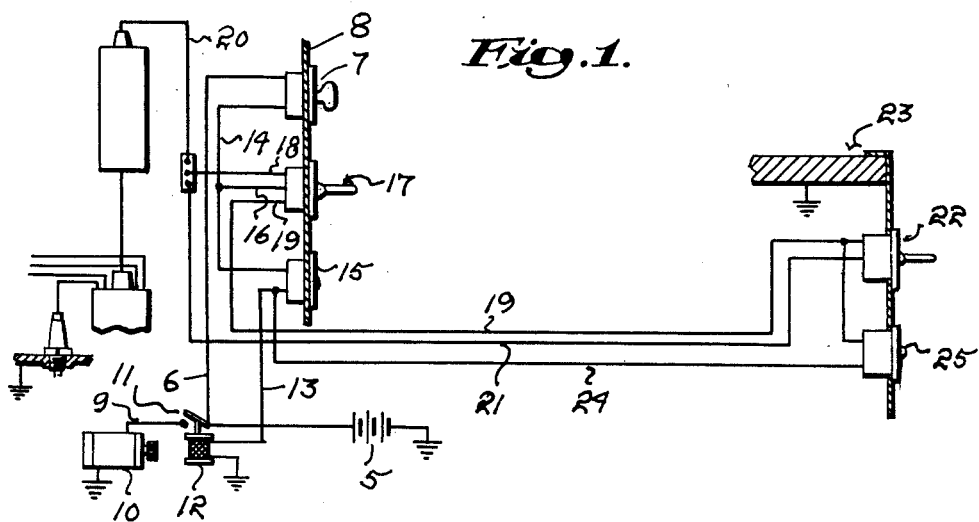
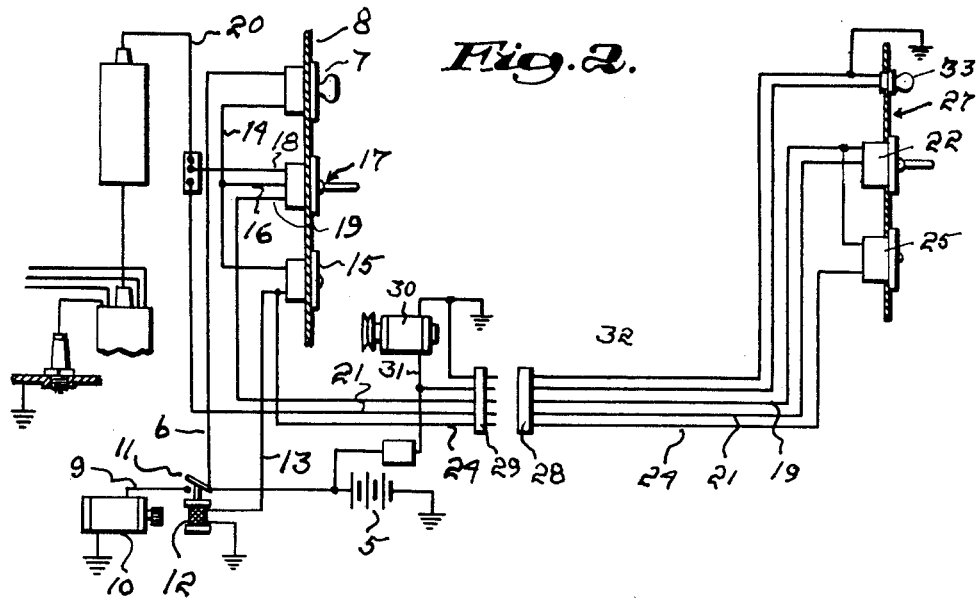
Inventor:
Alfred W. Pope,
by
Attorney

United States Patent Office 2,739,247
Patented Mar. 20, 1956

2,739,247

CONTROL FOR THE ENGINE AND STARTING CIRCUITS OF A MOTOR VEHICLE

Alfred W. Pope, Melrose, Mass.

Application November 18, 1954, Serial No. 469,665

3 Claims. (Cl. 290—38)

The present invention relates to a two station control for the engine and starting circuits of a motor vehicle.

The general objectives of the invention may be most readily appreciated by considering certain problems conveniently illustrated by reference to the delivery of fuel oil. When the driver stops to make a delivery, the necessary preparations take some time and during delivery his station is at the rear of the truck. If he leaves the engine running with the pump drive engaged from the time he leaves the cab until oil delivery is commenced, fuel is wasted and the pump is subjected to extra wear. If, however, the operator shuts off the engine until the preparations are complete at the rear end of the truck, the time and inconvenience in going to the control station defined by the cab to start the engine and returning to the rear end of the truck is considerable. It is, therefore, highly desirable to provide another station at the rear end of such trucks from which the starting and engine circuits may be controlled.

It will also be appreciated that the two stations may be widely separated. For example, the second station may be in the owner's home, thus to enable him to start his motor vehicle to have it suitably warmed up before he leaves the house.

In accordance with the invention, a two station control for the engine and starting circuits consists of a control circuit connected to the starting circuit and including a branch having a switch located at one station and movable between first and second positions. In the first of these positions, the branch is connected to the engine circuit and in the second position, a lead is connected to the branch. A pair of parallel leads, one connected to the engine circuit and the other including a normally open switch located at the second station, is connected to the starting circuit. Also located at the second station are switch means operable to connect or disconnect the parallel leads.

In the accompanying drawings, there are shown illustrative embodiments of the invention from which these and other of its objectives, novel features, and advantages will be readily apparent.

In the drawings:

Fig. 1 is a schematic view of control circuits in accordance with the invention enabling the control of the engine circuit to be effected from either of such spaced stations as the cab and the rear end of an oil delivery truck, and Fig. 2 is a like view of another embodiment of the invention for use when one of the stations is proximate to the driver's seat and the other station is remote therefrom, the interior of a house, for example.

In the embodiment of the invention illustrated by Fig. 1, the storage battery of a motor vehicle is indicated at 5 and has a lead 6 to the ignition switch 7 located on the instrument panel 8 in the cab of an oil delivery truck, for example. The lead 6 has a branch 9 to the starter motor 10 in which branch there is a normally open switch 11 adapted to be closed by the solenoid 12 in the lead 13.

The ignition switch 7 has a lead 14 including the normally open starter switch 15 shown as of the push button type to which the lead 13 is connected. The lead 14 has a branch 16 including the toggle switch 17 by which the leads 18 and 19 are connected in the alternative to the battery 5.

The lead 18 is connected to the engine circuit 20 as is the lead 21 from the toggle switch 22 located at the station 23, typically at the rear end of the truck. The switch 22 is adapted to connect the lead 21 to both of parallel interconnected leads 19 and 24, or to disconnect them therefrom. The lead 24 is connected to the lead 13 and includes a normally open switch 25 of the push button type located at the station 23.

From the foregoing, it will be appreciated that with the switch 17 positioned to interconnect the leads 16 and 18, the ignition circuit 20 is closed when the switch 7 is "turned on" and the engine may be started by operating the push button switch 15.

When the operator stops to make a delivery, the engine is stopped, the pump drive engaged, and the switch 17 positioned to interconnect the leads 16 and 19 before he leaves the cab. When preparations for delivery have been completed, the switch 22 is positioned to connect the lead 19 to the lead 21. The engine may now be started by operating the push button switch 25 with the ignition circuit 20 being energized via the lead 21.

After the delivery of the desired volume of oil, the operator positions the switch 22 to disconnect the lead 21 from the lead 19 thus stopping the engine. When the operator returns to the cab, the switch 17 must be returned to its original position to enable him to again start the engine after he has disengaged the pump drive.

In the embodiment of the invention illustrated by Fig. 2, the toggle switch 22 and the push button switch 25 are located at a station 27, in a house for example.

For that reason, the leads 19, 21, and 24 include complemental connector portions 28 and 29, thus enabling these leads to be connected or disconnected as desired. Thus, the leads may be connected until the motor vehicle is started in the manner described in connection with the embodiment of the invention shown in Fig. 1 and remain connected until the vehicle is to be moved.

As the two stations may be widely separated, it is desirable to have a signal at the station 27 operable while the engine is running and the leads interconnected. To accomplish this result, there is indicated a generator 30 to whose lead 31 there is connected a branch 32 to a signal, conveniently a light bulb 33. The lead 32 is also adapted to be connected or disconnected by means of the connector portions 28 and 29.

From the foregoing, it will be apparent that controls in accordance with the invention are well adapted to meet the various requirements of use and service.

What I therefore claim and desire to secure by Letters Patent is:

1. A two station control for the engine and starting circuits of a motor vehicle, said control comprising a control circuit connected to the starting circuit and including a branch, a switch in said branch at one station and having first and second positions, a lead to the engine circuit connected to said branch in said first position, a second lead connected to said branch in said second position, a pair of parallel leads, one connected to said engine circuit, and the other connected to said starting circuit and including a normally open, operator closed starting switch at the second station interconnecting said parallel leads, and switch means at the second station operable to connect and disconnect the one of said parallel leads from said second lead that is connected to said engine circuit.

2. A two station control for the engine and starting circuits of a motor vehicle, said control comprising a control circuit connected to the starting circuit and including a branch, a switch in said branch at one station and having first and second positions, a lead to the engine circuit connected to said branch in said first position, a second lead connected to said branch in said second position, a pair of parallel leads, one connected to said engine circuit and the other connected to said starting circuit and including a normally open, operator closed starting switch at the second station interconnecting said parallel leads, and switch means at the second station operable to connect and disconnect the one of said parallel leads from said second lead that is connected to said engine circuit, said second and parallel leads including separable connections.

3. A two station control for the engine and starting circuits of a motor vehicle, said control comprising a control circuit connected to the starting circuit and including a branch, a toggle switch in said branch at one station and having first and second positions, a lead to the engine circuit connected to said branch in said first position, a second lead connected to said branch in said second position, a pair of interconnected parallel leads, one connected to said engine circuit and the other connected to said starting circuit and including a normally open, operator closed starting switch at the second station, and a toggle switch at the second station operable to connect and disconnect the one of said parallel leads from said second lead that is connected to said engine circuit.

References Cited in the file of this patent
UNITED STATES PATENTS

| | | |
|---|---|---|
| 1,479,808 | Hayward | Jan. 8, 1924 |
| 2,367,960 | Parfitt | Jan. 23, 1945 |
| 2,450,904 | Moncrief | Oct. 12, 1948 |
| 2,544,955 | Harrelson | Mar. 13, 1951 |
| 2,569,332 | Perkins | Sept. 25, 1951 |
| 2,591,618 | Schaeffer | Apr. 1, 1952 |